Sept. 9, 1947.    G. W. ALDEEN    2,427,176
METHOD OF MAKING CABLE TERMINALS
Filed April 26, 1943    2 Sheets—Sheet 1

Inventor
Gedor W. Aldeen
BY
Parker, Carlson, Pitzner & Hubbard
Attorneys.

Sept. 9, 1947.   G. W. ALDEEN   2,427,176
METHOD OF MAKING CABLE TERMINALS
Filed April 26, 1943    2 Sheets-Sheet 2
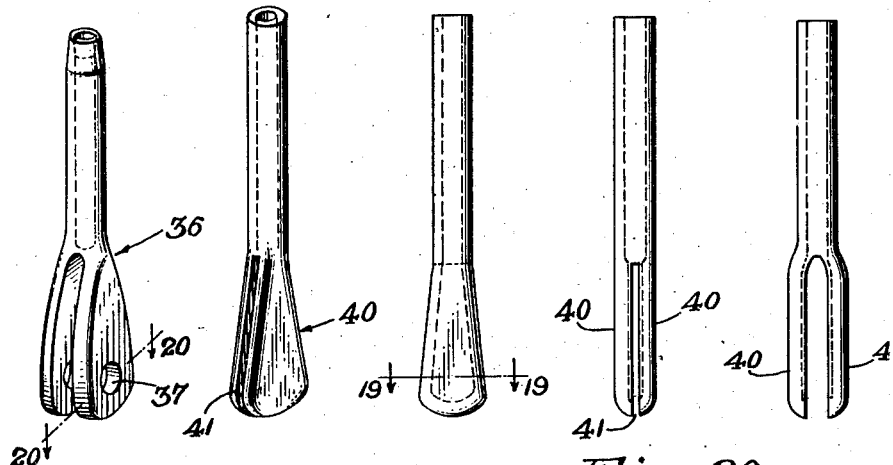
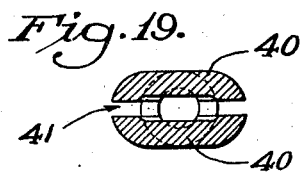
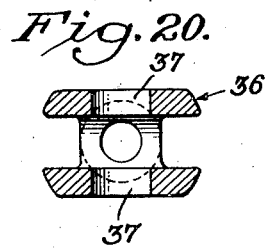
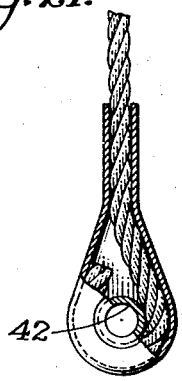
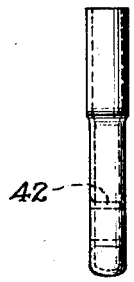
Inventor
Gedor W. Aldeen
BY
Parker, Carlson, Pitzner & Hubbard
Attorneys.

Patented Sept. 9, 1947

2,427,176

UNITED STATES PATENT OFFICE 2,427,176

METHOD OF MAKING CABLE TERMINALS

Gedor W. Aldeen, Rockford, Ill., assignor to American Cabinet Hardware Corporation, Rockford, Illinois, Rockford, Ill., a corporation of Illinois Application April 26, 1943, Serial No. 484,557

2 Claims. (Cl. 29—148)

1

The invention relates generally to a method of making cable terminals and more particularly to a cable terminal of the type used on stranded wire cable employed as a tension element.

The general object of the invention is to provide a novel method of making a cable terminal of such construction that it may be economically produced with a minimum waste of material in its production.

More specifically, it is an object to provide a cable terminal which, instead of being made of bar stock as usual with a consequent substantial waste of material, is made from a blank of sheet metal.

Another object is to provide a cable terminal made in such a manner that the waste of metal heretofore occurring in turning down and drilling the shank for the cable and the cost of these operations are eliminated.

It is also an object to provide a novel method of making a cable terminal which involves forming the terminal from a flat blank chiefly by drawing and swaging operations which may be performed with a minimum of cost and which result in a product requiring only minor cutting operations, removing but little metal to produce the finished article.

Still another object is to provide a novel cable terminal of such construction that the manner of securing the cable therein is greatly simplified and the overall length of the terminal is materially reduced.

Other objects and advantages will become apparent from the following description taken in connection with the accompanying drawings, in which.

Figure 1:
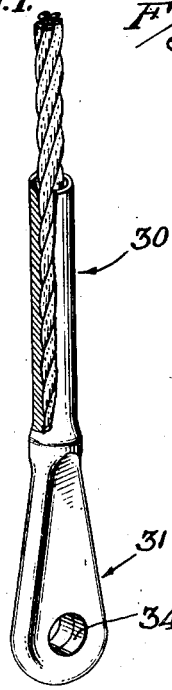
Figure 1 is a perspective view on an enlarged scale and partially in section, of a cable terminal embodying the features of the invention and showing the terminal assembled on the cable.

Figs. 5 to 13, inclusive, are perspective sectional views showing various steps utilized in forming the terminal.

Fig. 14 is a perspective view of a modified form of terminal.

Fig. 15 is a perspective view showing the article as formed in one of the intermediate steps in making the terminal of Fig. 14.

Figs. 16 to 18, inclusive, illustrate certain other steps in the process of manufacturing the terminal shown in Fig. 14.

2

Fig. 19 is an enlarged sectional view taken on the line 19—19 of Fig. 16.

Fig. 20 is an enlarged sectional view taken on the line 20—20 of Fig. 14.

Fig. 21 is a face view partially in section of another form of cable terminal and showing the manner in which the cable is positioned therein.

Fig. 22 is a side view of the cable terminal shown in Fig. 21.

Cable terminals of the character herein contemplated are those used on the end of a stranded wire cable serving as a tension member. Lengths of cables of this character are used as stays or guys, or may be used as an operator for exerting a pull on a certain part. Thus in airplanes stranded wire cables may be used as operators for the rudder or other parts of the plane. In all such instances, the cable instead of being secured directly to the part, is preferably provided with a terminal comprising a shank portion into which the cable extends, and an eye portion for attachment to the part. The eye portion, as indicated by its name, is provided with a central aperture through which a bolt or pin is passed to secure it to the part. The eye portion may be either single, as shown in Fig. 1, or may be bifurcated in the form of a yoke, as shown in Fig. 14.

Cable terminals have heretofore usually been manufactured from round bar stock. The eye portion may be formed by upsetting a sufficient amount of the stock to provide the desired amount of metal, or a bar of the size of the enlarged end may be used and the shank turned down from that. The enlarged portion is then flattened or milled, and drilled or punched to provide a hole therethrough. The hollow interior of the shank is usually formed by drilling the bar from the end. Such operations, as is obvious, requires a considerable length of time because of the large amount of metal removed, and involves a considerable waste of material. Thus cable terminals as heretofore made, involve considerable expense to manufacture.

The method of making cable terminals herein disclosed involves only inexpensive labor operations and provides a minimum waste of material. It thus provides a method of manufacture particularly suited to large quantity production. This method utilizes flat sheet metal as the raw material in place of the bar stock heretofore used, and the process involves principally a series of drawing operations followed by certain swaging steps to form the shank portion of the terminal. This results in a form which eliminates all turning and the long drilling operation and requires a minimum of machining operations to reduce the piece to final form. The metal removed by such machining operations is exceedingly small so that the waste of material is held to a minimum. The eye portion is formed from a part resulting from the drawing operations and is shaped chiefly by flattening. Formation of the hole or aperture in the eye portion occurs at the same time that it is flattened, by means of a punch, so that both the flattening and punching may be done in the same dies in one operation. Moreover, the quality and strength of the metal is improved by the swaging.

Figures 2, 3:
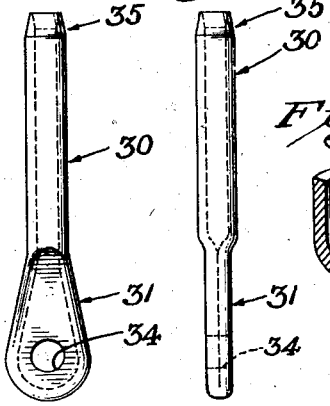
Figs. 2 and 3 are respectively face and side views of the terminal shown in Fig. 1.

The preferred embodiment of a cable terminal made in accordance with my invention is shown in Figs. 1, 2, and 3. In these figures the shank portion adapted to receive the cable is indicated at 30, while the eye portion is shown at 31. The shank portion 30 before being secured to the cable has an internal diameter such that the cable may readily be inserted endwise therein. To rigidly secure the cable and terminal together, the shank portion 30 is subjected to a swaging operation, after the cable is inserted, which operation forces the metal in and around the strands of the cable, as illustrated by the sectional portion of Fig. 1, and reduces the external diameter of the shank somewhat. The resulting union is found to have greater tensile strength than the cable itself.

Figure 4:
Fig. 4 is a perspective view of a blank from which the terminal is made.
Figure 5:
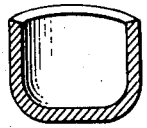
Figure 6:
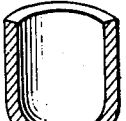
Figure 7:

As mentioned above, my novel method utilizes sheet metal such as a steel alloy as the raw material from which the terminal is made. Thus, the first step involved in the process is punching a round disk 32, as illustrated in Fig. 4. Preferably the disk has a thickness substantially equal to one-half the thickness of the eye portion 31 of the finished terminal. While the reason for this will become apparent from a description of the subsequent steps, briefly stated it is because, during the subsequent operations of drawing, etc., the thickness of that part of the metal forming the eye portion 31 is not changed. Thus the eye portion, which is formed by flattening a hollow part, has a final thickness equal to twice the thickness of the disk 32.

The next step or steps in the process after punching the disk 32 involves a series of drawing operations (illustrated in Figs. 5 to 9, inclusive) during which the metal is changed in shape from the disk 32 to the elongated tube 33. The tube, as will be noted, is closed at one end. While I have illustrated five such drawing operations herein, with each drawing operation after the first causing a reduction in diameter and increase in length, the invention is by no means limited to such specific number of drawing operations. The number of such operations depends on several factors including the character of the metal of which the terminal is made, and the size of the terminal. Another factor which affects the depth of draw in any one operation and consequently the number of drawing operations, is the manner and amount of lubrication that can be effected. It is also found that by a heavy copper plating of the blank or disk 32, the drawing is greatly facilitated and the copper remains on the metal throughout all the drawing operations.

Between certain of the drawing operations I preferably anneal the metal to prevent splitting or cracking and to facilitate the drawing. Such annealing, because of the copper plate, is preferably done in what is known as a bright annealing furnace, which excludes all oxygen and permits the copper coating to remain on the metal. The number of times the metal is annealed during the various drawing operations depends on the particular character of the metal being drawn. Thus with high carbon steel more annealing is necessary than with low carbon steel. Depending upon the character of the steel, one, two, or three drawing operations may be performed between each annealing.

Figure 8:
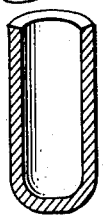
Figure 9:
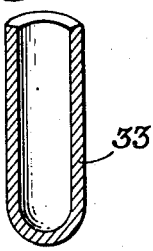

While the thickness of the wall is shown as unchanged in the various drawing operations of Figs. 5 to 9, I may utilize the last of the drawing operations, namely, those shown in Figs. 8 and 9, to effect a partial reduction in wall thickness of that part of the tube which eventually produces the shank portion of the terminal. Obviously such reduction in wall thickness will increase the length of the tube and consequently reduce the amount of swaging necessary in subsequent operations.

Figure 11:
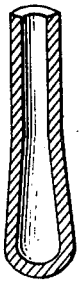
Figure 10:

Following the series of drawing operations, the tube may be partially reduced in diameter, as illustrated in Figs. 10 and 11, by pressing operations. Such pressing operations are performed in a die with the closed end of the tube upward, and while not affecting the wall thickness of the tube, have the function of bringing the closed end portion of the tube to substantially that form which will result in the proper shape for the eye portion by a mere flattening operation. Thus in the subsequent operations, the closed end portion will require but little or no swaging to bring it to the desired form for flattening. However, the two pressing operations shown in Figs. 10 and 11 may be eliminated and a further drawing operation substituted therefor, which will bring the tube to a shape where it can readily be swaged to the desired form.

Following the two pressing operations, or the drawing operation which may be substituted therefor, the tube is then swaged in one or more operations, depending upon the amount of reduction in diameter and thickness of metal that still has to take place. Such swaging is performed with a mandrel inside of the tube so that not only the outside diameter but also the inside diameter may be readily controlled. In the illustrative form shown in the drawings, two swaging operations are performed and the results thereof are respectively illustrated in Figs. 12 and 13. These swaging operations are preferably performed while the metal is cold and a rotary swaging machine is utilized to perform the work. It may also be desirable to anneal the work before subjecting it to the swaging operations.

As mentioned above, swaging operations broadly may be said to perform two functions, namely, the reduction in diameter of the shank portion, and the reduction of the wall thickness thereof. The part of the tube utilized to form the eye portion of the terminal may be swaged to a limited extent, but swaging on this portion is relatively slight and primarily may be said to be utilized only to taper it down to properly blend with the shank portion. The principal part of the swaging takes place on the shank portion and is such that in the two swaging operations the external diameter of the shank portion is reduced to finished size. Such reduction in diameter obviously increases the length of the shank portion since none of the metal is wasted.

Since the swaging is done with a mandrel inserted into the tube, the internal diameter may be controlled or determined. The mandrel of course is utilized only in the shank portion since it could not be used inside of the part forming the eye portion because the mandrel would thereby be locked into the tube. Moreover, it is unnecessary to have the mandrel inside of the eye portion because it is desired to have the wall thickness of the eye portion remain unchanged. The thinning of the wall thickness of the shank portion, however, is desired, and such thinning causes an increase in length of the shank portion during the swaging operations.

Figure 13:
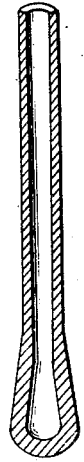
Figure 12:
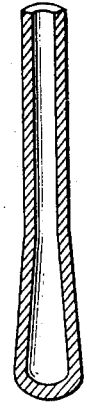

The result of the various operations, which bring the metal to the form shown in Fig. 13, is to properly distribute the metal so that only a few simple operations are thereafter required to bring the terminal to finished size and form.

The finishing operations on the eye portion are performed on a press. These include flattening the enlarged closed end of the tube. Since the metal has been properly distributed, the flattening brings the eye portion to the shape shown at 31 in Figs. 1, 2, and 3. The metal is preferably annealed before flattening to avoid cracking. At the same time that the eye portion is flattened, a hole or aperture 34 is pierced therethrough. Such piercing is performed by a punch which has a tendency to make a slightly rounded corner at the side where the punch first contacts the metal. To eliminate this rounded corner and to smooth the interior of the hole, a broaching operation is performed which takes off a very light cut sufficient to eliminate the rounding. Preferably the flattening and punching take place in one operation, while the broaching may be performed in the same dies but with the work moved over to a different position in the dies. Thus the three operations, namely, flattening, punching, and broaching, may be performed in one machine.

Since the wall thickness of the closed end portion of the tube throughout the various operations remains unchanged from the original thickness of the disk 32, the thickness of the eye portion is substantially twice the thickness of the original disk 32. The eye portion thus comprises two layers in face-to-face relation with the layers integrally joined around their entire periphery.

As to the finishing operations on the shank portion, the swaging operations result in a rough end which is first trimmed off. While swaging the piece over a mandrel results in a quite accurate internal diameter, the mandrel is slightly tapered to facilitate withdrawal thereof. Since the cable is to be inserted into the shank portion, it is of course desirable to have a uniform internal diameter for this portion. Therefore a drill is run into the shank portion to remove the slight taper. However, very little metal is removed by the drill since the taper is of very small degree. This drilling operation may be said to be merely truing the internal diameter of the shank portion. The end of the shank portion is preferably finished both internally and externally with a slight bevel or taper, as clearly illustrated at 35 in Figs. 1, 2, and 3. The external tapering is preferably effected by swaging, while the internal tapering or beveling is performed by a machining operation, removing but little metal.

The cable terminal shown in Fig. 14 is made in substantially the same manner as that shown in Fig. 1, the difference being merely in the particular shape of the eye portion and the consequent additional steps utilized to form the eye portion of the terminal of Fig. 14. This terminal may comprise a shank portion similar in form to the shank portion 30. The eye portion, however, instead of being a single member as shown at 31 in Fig. 1, is bifurcated or in the form of a yoke, as illustrated at 36 in Fig. 14. An aperture 37 extends through both arms of the yoke 36 in the same manner as the aperture 34 extends through the eye portion 31.

In the manufacture of the terminal shown in Fig. 14, the same steps are utilized, as in the case of the form shown in Fig. 1, to bring the metal to the form shown in Fig. 13. In other words, to make the terminal of Fig. 14 I start with a disk 32 and carry it through the various drawing and swaging operations to bring it to the form shown in Fig. 13.

Following the last swaging operation, the next step in making the terminal of Fig. 14 is to partially flatten the closed end portion of the tube, resulting in the form shown in Fig. 15. By such partial flattening, two relatively flat face portions 40 are formed with their inner surfaces in spaced relation. The flattened portion is then slit endwise in a plane parallel to the face portions 40, the slit being indicated at 41 in Figs. 16, 17, and 19. Preferably such slit is of less width than the space between the face portions 40. Thus the metal is cut only around the periphery of the face portions where the two are integrally joined.

The next step in the manufacture of this form of terminal is to spread the two face portions 40 to bring them to the spacing desired in the finished terminal. For this purpose, the terminal is held in a die and a wedge-like plunger is forced into the slit endwise to spread the two face portions 40 apart. While such spreading causes the desired spacing of the face portions, the cross sectional form of the face portions is not quite that desired in the finished terminal. Therefore the face portions 40 are subjected to a further flattening operation which is performed in a die having an insert placed between the two face portions to maintain the proper spacing therebetween and flatten the inner surfaces of the face portions. With such insert in place the two face portions 40 may be flattened to provide smooth inner and outer faces thereon as clearly illustrated in Fig. 20. In the same die, the hole or aperture 37 through the two face portions may be pierced as by punching and broaching.

The shank portion of this form of terminal is finished in the same manner as the shank portion of the terminal shown in Fig. 1. Thus, the terminal of Fig. 14 involves in its manufacture substantially the same operations as are performed in the manufacture of the terminal of Fig. 1.

As mentioned herein, the terminal of Figs. 1 and 14 are adapted to be secured to the cable solely by swaging the shank portions of the terminals onto the cable so that the metal of the shank portion is forced in and around the strands of the cable. The cable is composed of several strands twisted around a center strand, and each strand is composed of a plurality of wires. The shank portion of the terminal has a length equal to or longer than one complete twist or turn of a strand. Thus, when the metal of the shank portion is swaged onto the cable, it contacts all of the external strands and a maximum grip on the cable is attained.

The form of terminal shown in Figs. 21 and 22 is of such construction that the shank portion of the terminal may be made considerably shorter and still sufficiently grip the cable. To hold the cable in the terminal in this form, the eye portion of the terminal is made hollow, and the cable extends into the eye portion and is bent around a thimble or sleeve therein. The eye portion of the cable is then subjected to a simple flattening operation which grips the bent portion of the cable and retains it within the terminal. The short shank portion may also be swaged, but the total length of cable gripped by the eye and shank portions is equal to or longer than one complete twist of one strand.

In the manufacture of the terminal shown in Figs. 21 and 22, I preferably make the wall thicknesses of the shank portion and the eye portion the same. Thus in the swaging operations it is only necessary to reduce the diameter of the shank portion, and no change in the wall thickness is needed.

Generally, the operations are similar to that performed in the manufacture of the terminal shown in Fig. 1. I start by punching a disk of the desired diameter to produce sufficient metal to make the entire terminal. The thickness of the disk, however, is substantially equal to the thickness of the wall of the eye portion of the finished terminal. This disk I pass through a series of drawing operations and swaging operations similar to those utilized in the manufacture of the form of Fig. 1, except that I do not reduce the wall thickness of the shank portion and I do not make it as long as in the other forms. After the swaging operations, the closed end portion of the tube is flattened sufficiently to bring the thickness thereof substantially equal to the diameter of the shank portion, as illustrated in Fig. 22. This leaves the face portions spaced from each other a distance equal to the internal diameter of the shank portion. Consequently a cable which fits into the shank portion will also fit into the interior of the eye portion. The shank portion is drilled to true the interior thereof, in the same manner as in the case of the first form, and the eye portion is pierced transversely to provide a hole through the two face walls. Thereafter a sleeve or thimble 42 may be inserted in the aperture of the eye portion and riveted at its ends to hold it in place.

In assembling the terminal with the cable, as shown in Fig. 21, the cable is inserted endwise into the shank portion and forced into the interior of the eye portion around the sleeve or thimble 42, thus forming a bend in the cable. The two are then rigidly secured together by placing the eye portion of the terminal in a press and slightly flattening the eye portion. This clamps the bent part of the cable firmly between the two faces of the eye portion and slightly flattens the cable, and thus provides a rigid union between the two. The shank portion of the terminal is swaged for additional security and the flattening and swaging, together, sufficiently secure the cable in place.

While the thimble or sleeve 42 may be riveted in place before the cable is inserted into the terminal, the cable may be placed within the terminal before the sleeve 42 is inserted. The sleeve 42 may then be forced into place and riveted in the same pressing operation in which the flattening of the eye portion is performed.

From the foregoing, it will be apparent that I have provided a novel cable terminal of such construction that it may be economically produced with a minimum waste of material. In the manufacture of the terminal herein shown, practically all of the metal of the stock from which the terminal is made is utilized in the terminal, and the waste of metal heretofore incurred in machining the shank is eliminated. Moreover, the high labor cost of the machining operations is eliminated. What few machining operations are involved in the present method may be speedily performed and remove but little metal. The principal steps in the process of the invention may be applied to the various forms of terminals shown herein, with only slight variations to provide the different specific forms of terminals. It will also be apparent that I have provided a novel cable terminal which affords an extremely firm union with the cable and which may be made substantially shorter.

I claim as my invention:

1. The method of making a cable terminal having a tubular shank open at one end and an eye portion at the other end of the shank, said method comprising drawing a steel disk to produce an elongated tube closed at one end and open at the other end, swaging the open end portion of the tube to reduce the diameter thereof while simultaneously lengthening such portion and decreasing the wall thickness thereof while leaving the wall thickness at the closed end substantially unchanged, and shaping the closed end portion of the tube to form a flattened portion to constitute the eye portion of the terminal.

2. The method of making a cable terminal having a tubular shank open at one end and an eye portion at the other end, which comprises drawing from a disk of steel or the like an elongated tube closed at one end and open at the other, shaping the tube thus formed so as to reduce the diameter of the open end portion without substantially changing the thickness of the tube wall then swaging the open end portion of the tube to elongate it and reduce the wall thickness while leaving the wall thickness at the closed end of the tube substantially unchanged, then shaping the closed end portion of the tube into elongated tapering form, and finally forming the eye portion for the terminal by flattening the tapering portion to form two opposed layers of metal integrally connected around the entire periphery of the eye portion.

GEDOR W. ALDEEN.

REFERENCES CITED

The following references are of record in the file of this patent:

UNITED STATES PATENTS

| Number | Name | Date |
|---|---|---|
| 459,364 | Kelley | Sept. 8, 1891 |
| Re. 14,401 | Andrews | Dec. 4, 1917 |
| 2,304,194 | Payne | Dec. 8, 1942 |
| 2,038,535 | Brenizer | Apr. 28, 1936 |
| 2,247,041 | Bergan | June 24, 1941 |
| 1,227,726 | Woodhead | May 29, 1917 |
| 2,050,855 | Oppenheim | Aug. 11, 1936 |
| 2,211,615 | Brickman et al. | Aug. 13, 1940 |
| 2,244,696 | Hayden | June 10, 1941 |
| 2,262,802 | Hayden | Nov. 18, 1941 |
| 1,782,447 | Scranton | Nov. 25, 1930 |
| 1,438,933 | Bungay | Dec. 12, 1922 |
| 1,106,109 | Phillips | Aug. 14, 1914 |
| 1,505,553 | Gilmore | Aug. 19, 1924 |
| 1,949,601 | Burd | Mar. 6, 1934 |
| 1,368,480 | Brown | Feb. 15, 1921 |
| 2,111,505 | Card | Mar. 15, 1938 |